(12) United States Patent
Russell

(10) Patent No.: US 11,167,239 B2
(45) Date of Patent: Nov. 9, 2021

(54) PRESSURE SWING ADSORPTION INTEGRATION IN STEAM CRACKING ETHYLENE PLANTS FOR IMPROVED HYDROGEN RECOVERY

(71) Applicant: UOP LLC, Des Plaines, IL (US)

(72) Inventor: Bradley P. Russell, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 447 days.

(21) Appl. No.: 16/392,387

(22) Filed: Apr. 23, 2019

(65) Prior Publication Data

US 2020/0101411 A1 Apr. 2, 2020

Related U.S. Application Data

(60) Provisional application No. 62/739,032, filed on Sep. 28, 2018.

(51) Int. Cl.
*C01B 3/56* (2006.01)
*B01D 53/047* (2006.01)

(52) U.S. Cl.
CPC .............. *B01D 53/047* (2013.01); *C01B 3/56* (2013.01); *B01D 2253/102* (2013.01); *B01D 2253/116* (2013.01); *B01D 2253/1122* (2013.01); *B01D 2253/25* (2013.01); *B01D 2256/16* (2013.01); *B01D 2257/502* (2013.01); *B01D 2257/7025* (2013.01); *C01B 2203/047* (2013.01); *C01B 2203/048* (2013.01); *C01B 2203/0425* (2013.01); *C01B 2203/1235* (2013.01); *F25J 2205/60* (2013.01)

(58) Field of Classification Search
CPC .............. B01D 53/047; B01D 53/0423; B01D 2253/102; B01D 2253/104; B01D 2253/1122; B01D 2253/116; B01D 2253/25; B01D 2256/116; B01D 2257/502; B01D 2257/7025; C01B 3/56; C01B 2203/0425; C01B 2203/043; C01B 2203/047; C01B 2203/048; C01B 2203/1235; F25J 2205/60; Y02C 20/20; Y02P 20/156
USPC .................. 62/618, 626, 636; 95/96, 140
See application file for complete search history.

(56) References Cited

U.S. PATENT DOCUMENTS

| | | | | |
|---|---|---|---|---|
| 5,744,687 A * | 4/1998 | Ramachandran | .... | C10G 70/046 585/829 |
| 5,979,178 A * | 11/1999 | Engler | .... | F25J 3/0252 62/624 |
| 6,141,988 A * | 11/2000 | Engler | .... | F25J 3/0219 62/624 |
| 6,444,869 B2 * | 9/2002 | Senetar | .... | C07C 11/04 585/809 |
| 10,329,499 B2 * | 6/2019 | Shafi | .... | C10G 19/00 |
| 2015/0376092 A1 * | 12/2015 | Tsai | .... | C10L 3/101 48/127.3 |

* cited by examiner

*Primary Examiner* — Frank M Lawrence, Jr.
(74) *Attorney, Agent, or Firm* — Paschall & Associates, LLC; Mark Goldberg

(57) ABSTRACT

A process is provided for increasing the recovery of high-purity hydrogen from a steam cracking process in situations where byproduct methane yield is high relative to hydrogen. After a hydrocarbon gas stream is sent through a cold box and demethanizer, a small proportion of methane is sent through a pressure swing adsorption unit separately from a gas stream that contains hydrogen to increase high-purity hydrogen recovery by about 6%.

7 Claims, 4 Drawing Sheets

PRESSURE SWING ADSORPTION INTEGRATION IN STEAM CRACKING ETHYLENE PLANTS FOR IMPROVED HYDROGEN RECOVERY

This application claims priority from provisional application 62/739,032, filed Sep. 28, 2018, which is incorporated herein in its entirety.

BACKGROUND OF THE INVENTION

Hydrogen is a valuable product that is used in refining and petrochemicals processing, and methods are needed to increase hydrogen recovery from pressure swing adsorption (PSA) units. This is especially true in regions where hydrogen has a high value and current practice uses added compression power (vacuum regeneration, tail-gas recycle, or two PSAs in series) to increase hydrogen recovery. This invention proposes an alternative approach that can be applied in steam cracking plants for ethylene production, where hydrogen and methane are produced as byproducts. These byproducts are typically used as fuel in the cracking furnace, with a slipstream of hydrogen purified in a PSA unit for internal use in the process and possibly exported as product. This invention uses a slipstream of methane byproduct in the PSA unit to increase recovery of purified hydrogen. This slipstream of methane is recovered in PSA tail gas and retains its fuel value.

Pressure swing adsorption processes utilize the fact that under high pressure, gases tend to be attracted to solid surfaces, or "adsorbed". The higher the pressure, the more gas is adsorbed. When the pressure is reduced, the gas is released, or desorbed. PSA processes can be used to separate gases in a mixture because different gases tend to be attracted to different solid surfaces more or less strongly. If a gas mixture such as air is passed under pressure through a vessel containing an adsorbent bed of zeolite that attracts nitrogen more strongly than oxygen, part or all of the nitrogen will stay in the bed, and the gas exiting the vessel will be richer in oxygen than the mixture entering. When the bed reaches the end of its capacity to adsorb nitrogen, it can be regenerated by reducing the pressure, thus releasing the adsorbed nitrogen. It is then ready for another cycle of producing oxygen-enriched air.

Aside from their ability to discriminate between different gases, adsorbents for PSA systems are usually very porous materials chosen because of their large specific surface areas. Typical adsorbents are activated carbon, silica gel, alumina, resin and zeolite. Though the gas adsorbed on these surfaces may consist of a layer only one or at most a few molecules thick, surface areas of several hundred square meters per gram enable the adsorption of a significant portion of the adsorbent's weight in gas. In addition to their selectivity for different gases, zeolites and some types of activated carbon called carbon molecular sieves may utilize their molecular sieve characteristics to exclude some gas molecules from their structure based on the size of the molecules, thereby restricting the ability of the larger molecules to be adsorbed.

A pressure swing adsorption (PSA) unit is often used on the byproduct hydrogen stream from an olefins production plant (steam cracker) in order to recover purified hydrogen (>99.9 mol %) for use within the process and export. This is the third largest application of PSA hydrogen, and there are about 150 units in this service that have been sold by UOP LLC, Des Plaines, Ill. In many cases, hydrogen is highly valued and there is a desire to increase PSA recovery.

SUMMARY OF THE INVENTION

This invention describes a method for increasing PSA hydrogen recovery by about 6 percentage points by using a slipstream of byproduct methane from a cold box/demethanizer as a co-feed in the PSA unit. This integration concept is well suited for naphtha, LPG, or mixed-feed ethane steam crackers (not ethane-only), where methane yield is high relative to hydrogen. In this case, only a small percentage of byproduct methane is used in the PSA unit, with a minimal impact to the overall process.

A key enabling feature for this flow scheme is the use of an activated alumina adsorbent that may or may not contain copper (e.g., CuCl on alumina) at the feed end of PSA bed. This type of adsorbent has very low methane capacity, and therefore allows efficient methane purge during a high-pressure co-feed step. Addition of copper to this activated alumina adsorbent increases adsorption of carbon monoxide and further improves PSA performance.

The invention provides a system and process for increased pressure swing adsorption hydrogen recovery by using a slipstream of a byproduct methane stream.

DETAILED DESCRIPTION OF THE INVENTION

This invention describes a method for increasing PSA hydrogen recovery by about 6 percentage points by using a slipstream of byproduct methane from a cold box/demethanizer as a co-feed in the PSA unit. This integration concept is well suited for naphtha, LPG, or mixed-feed ethane steam crackers (not ethane-only), where methane yield is high relative to hydrogen. In this case, only a small percentage of byproduct methane is used in the PSA unit, with a minimal impact to the overall process.

A key enabling feature of this process is the use of an activated alumina adsorbent that may or may not contain copper (such as CuCl on alumina) at the feed end of the PSA bed. This type of adsorbent has very low methane capacity, and therefore allows efficient methane purge during the high-pressure co-feed step. Addition of copper to this activated alumina adsorbent increases adsorption of carbon monoxide and further improves PSA performance. This concept can be used for both new steam cracking units and revamps. For new units, 1 additional bed is included in the PSA unit, and a somewhat larger tail gas compressor is required for recompression of the methane co-feed stream. Revamps of existing units would require reloading of existing PSA beds, addition of one bed, and a small auxiliary tail gas compressor.

Key process integration features are shown in the invention. Byproduct methane and hydrogen are separated from C2+ components in the demethanizer/cold box section. A turbo-expander is often used for power recovery from the cold, high-pressure methane stream prior to chilling recovery and consumption as cracking furnace fuel. In the proposed scheme, a slipstream is taken upstream of turbo-expander and routed to PSA unit as co-feed. In the PSA cycle, this methane co-feed purges additional high-purity hydrogen from the product end of the bed. The penalty for using part of the methane stream in PSA is: (1) recompression of methane in tail gas compressor, (2) reduced turbo-expander power export, and (3) reduced chilling recovery in demethanizer feed/effluent heat exchanger. However, when methane yield is large relative to hydrogen (e.g., naphtha and LPG feedstocks), these debits are small compared to the value of additional extracted hydrogen since only a small percentage (<10%) of byproduct methane is used in the PSA unit.

An important feature of this invention is the use of a copper adsorbent in the PSA unit for selective removal of carbon monoxide at the feed end of the bed (see FIG. 3). As shown by the CO and methane adsorption isotherms, this type of adsorbent has low methane capacity and high CO selectivity. Low methane loading at the feed end of the bed is critical for the methane co-purge to work properly. An example for a new 1000 KMTA ethylene plant (naphtha steam cracker) is provided.

Figure 1:
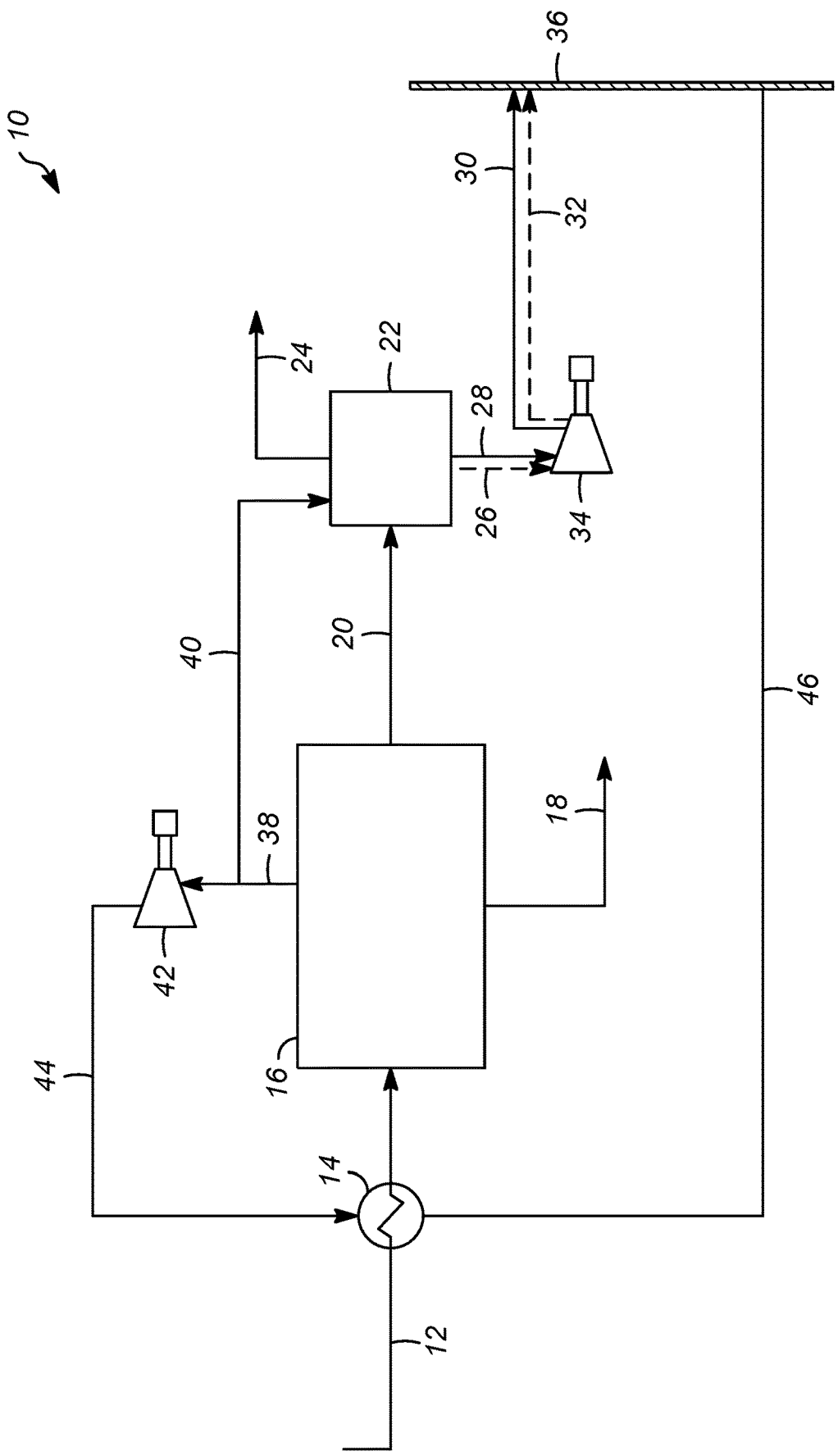
FIG. 1 shows the basic flow scheme of the invention to increase hydrogen recovery from a steam cracking plant.

FIG. 1 shows a gas feed 12 that may be compressed and dried that passes through heat exchanger 14 to a demethanizer/cold box 16. A methane stream 38 is sent to turbo-expander 42 and then stream 44 is sent through heat exchanger 14 to stream 46 and then to be cracking furnace fuel 36. A stream 18 of C2+ is sent to fractionation. A hydrogen stream 20 is sent from demethanizer/cold box 16 to pressure swing adsorption unit 22. A portion of methane stream 38 is sent in stream 40 to pressure swing adsorption unit 22 as a co-feed gas. The PSA unit 22 produces a high-pressure, high-purity (>99.9 mol % H2) hydrogen product stream 24 and a low-pressure tail gas stream 28. The tail gas stream 28 is compressed by compressor 34 to form compressed stream 30 and is used as cracking furnace fuel 36. The dashed lines 26 and 32 in FIG. 1 indicate that the entire methane stream 40 is recovered in the mixed tail gas stream 28 and 30 and retains its value as cracking furnace fuel in 36.

Figure 2:
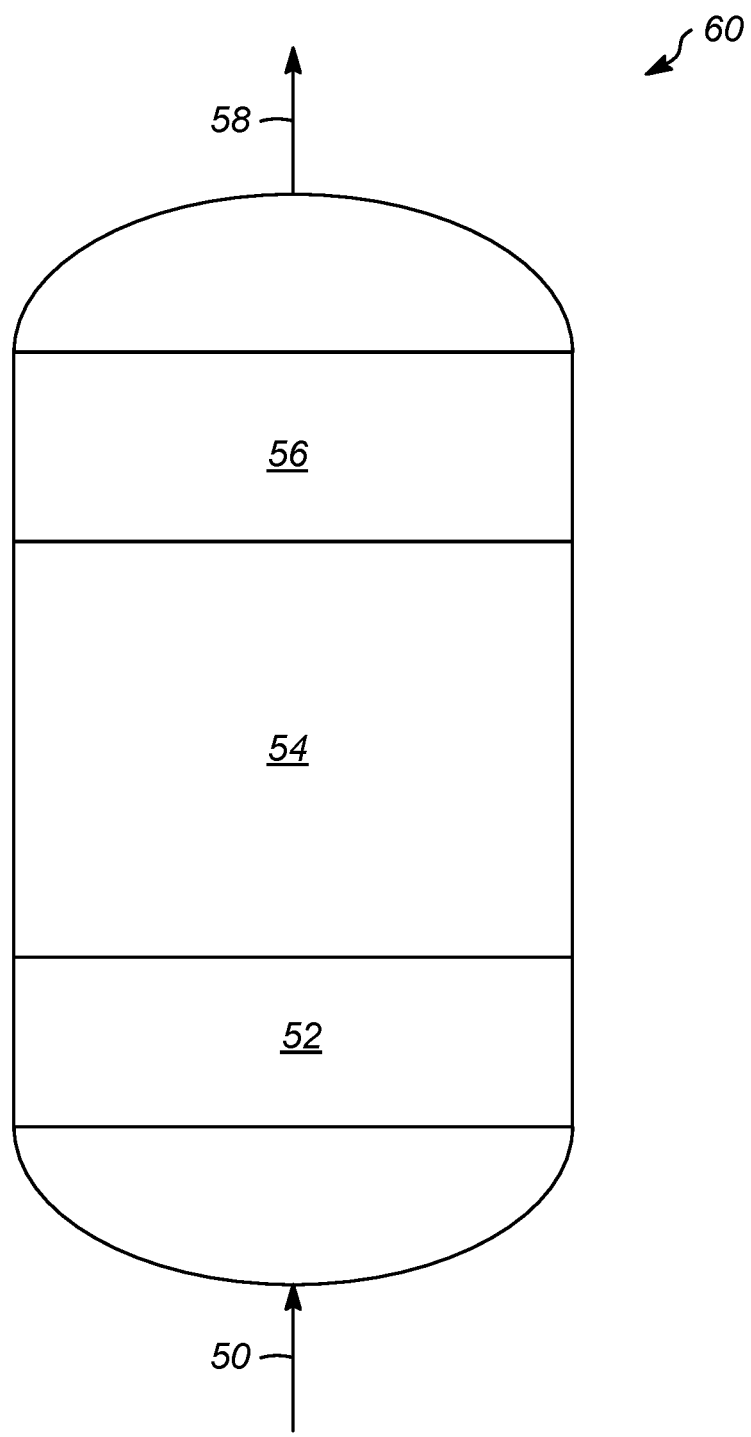
FIG. 2 shows an adsorbent bed with the layers of adsorbent that are used.

FIG. 2 shows an adsorbent vessel 60 with a methane co-feed 50 passing through three layers of adsorbent. The bottom layer 52 of adsorbent is a Cu1+ adsorbent, the middle layer 54 of adsorbent may be activated carbon and the top layer 56 of adsorbent may be a 5 A molecular sieve. High purity hydrogen exits in stream 58.

Figure 3A:
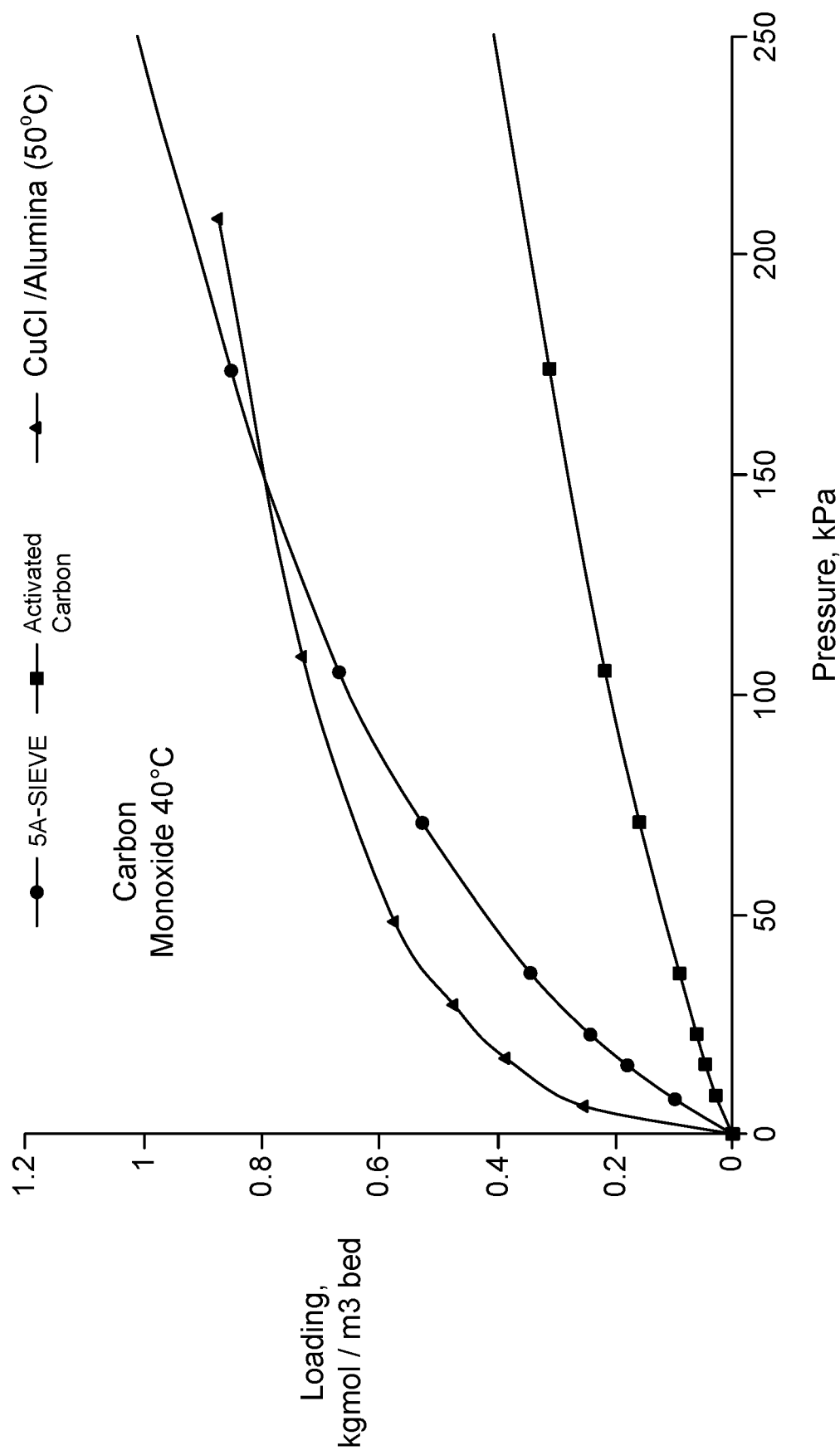
FIG. 3A shows an isotherm for carbon monoxide removal at 40° C.
Figure 3B:
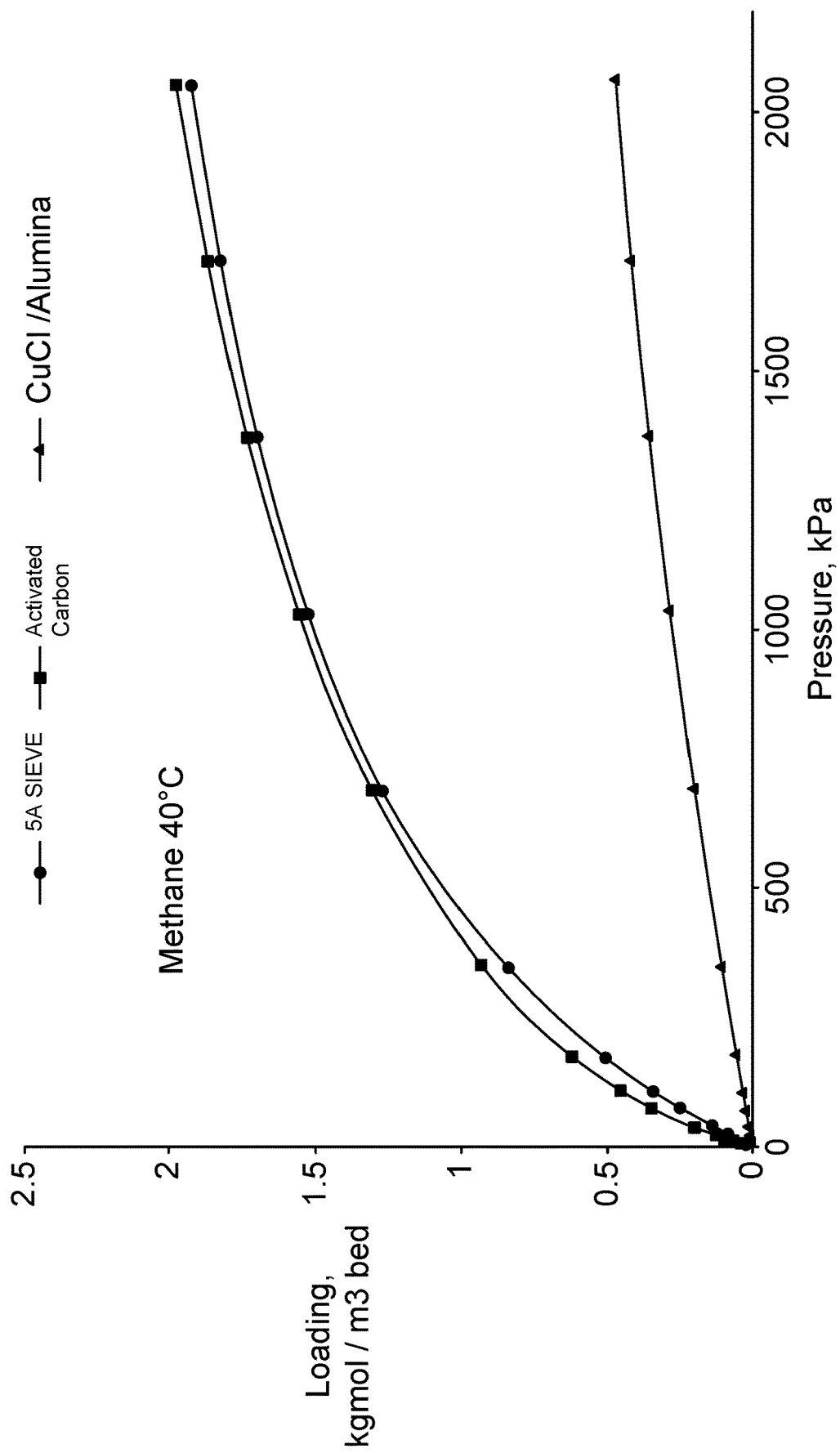
FIG. 3B shows an isotherm for methane at 40° C.

FIG. 3A shows an equilibrium isotherm for carbon monoxide on different adsorbents The circles indicate the top layer of 5 A molecular sieve adsorbent, the squares indicate the middle layer of activated carbon adsorbent and the triangles indicate the bottom layer of CuCl/alumina adsorbent. FIG. 3B shows the isotherms for methane with the adsorbent layers identified as in FIG. 3A.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for producing high purity hydrogen from a gas stream comprising hydrocarbons comprising passing the gas stream through a demethanizer unit to produce a C2+ stream, a methane stream and a hydrogen stream; sending a portion of the methane stream and the hydrogen stream to a pressure swing adsorption unit to produce a high purity hydrogen stream and a tail gas stream. An embodiment of the invention is one, any or all of prior embodiments in this paragraph up through the first embodiment in this paragraph wherein the pressure swing adsorption unit comprises a layer of a copper containing adsorbent to remove carbon monoxide from the gas stream. An embodiment of the invention is one, any or all of prior embodiments in this paragraph up through the first embodiment in this paragraph wherein the layer of a copper containing adsorbent removes carbon monoxide from the gas stream. An embodiment of the invention is one, any or all of prior embodiments in this paragraph up through the first embodiment in this paragraph wherein the layer of copper containing adsorbent adsorbs a very low proportion of methane from the gas stream. An embodiment of the invention is one, any or all of prior embodiments in this paragraph up through the first embodiment in this paragraph wherein the pressure swing adsorption unit comprises a layer of activated carbon adsorbent. An embodiment of the invention is one, any or all of prior embodiments in this paragraph up through the first embodiment in this paragraph wherein the pressure swing adsorption unit comprises a layer of a 5 A molecular sieve. An embodiment of the invention is one, any or all of prior embodiments in this paragraph up through the first embodiment in this paragraph, further comprising at least one of sensing at least one parameter of the process and generating a signal from the sensing; sensing at least one parameter of the process and generating data from the sensing; generating and transmitting a signal; generating and transmitting data.

The invention claimed is:

1. A process for producing high purity hydrogen from a gas stream comprising hydrocarbons comprising passing said gas stream through a demethanizer unit to produce a C2+ stream, a methane stream and a hydrogen stream; sending a portion of said methane stream and said hydrogen stream to a pressure swing adsorption unit to produce a high purity hydrogen stream and a tail gas stream.

2. The process of claim 1 wherein said pressure swing adsorption unit comprises a layer of a copper containing adsorbent to remove carbon monoxide from said gas stream.

3. The process of claim 2 wherein said layer of a copper containing adsorbent removes carbon monoxide from said gas stream.

4. The process of claim 2 wherein said layer of copper containing adsorbent adsorbs a very low proportion of methane from said gas stream.

5. The process of claim 1 wherein said pressure swing adsorption unit comprises a layer of activated carbon adsorbent.

6. The process of claim 1 wherein said pressure swing adsorption unit comprises a layer of a 5 A molecular sieve.

7. The process of claim 1, further comprising at least one of:
   sensing at least one parameter of the process and generating a signal from the sensing;
   sensing at least one parameter of the process and generating data from the sensing;
   generating and transmitting a signal;
   generating and transmitting data.

* * * * *